United States Patent
Athani (10) Patent No.: US 10,244,542 B2
(45) Date of Patent: Mar. 26, 2019

(54) MOBILE COMMUNICATION DEVICE CLUSTERING

(71) Applicant: Microsoft Technology Licensing, LLC, Redmond, WA (US)

(72) Inventor: Pavan Yaduraj Athani, Hubli (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 361 days.

(21) Appl. No.: 15/014,544

(22) Filed: Feb. 3, 2016

(65) Prior Publication Data

US 2017/0223717 A1    Aug. 3, 2017

(51) Int. Cl.
*H04B 7/155* (2006.01)
*H04L 29/08* (2006.01)
(Continued)

(52) U.S. Cl.
CPC ...... *H04W 72/085* (2013.01); *H04B 7/15507* (2013.01); *H04L 67/1051* (2013.01);
(Continued)

(58) Field of Classification Search
CPC ... H04W 72/085; H04W 76/14; H04W 76/10; H04W 40/22; H04W 48/17;
(Continued)

(56) References Cited

U.S. PATENT DOCUMENTS 6,377,796 B1    4/2002 Giannatos
7,139,578 B2    11/2006 An
(Continued)

FOREIGN PATENT DOCUMENTS

WO    2011153507 A2    12/2011
WO    2015128537 A1    9/2015

OTHER PUBLICATIONS

Deosarkar, B. et al., "Clusterhead Selection in Clustering Algorithms for Wireless Sensor Networks: A Survey", In Proceedings of International Conference on Computing, Communication and Networking, Dec. 18, 2008, Karur, Tamil Nadu, India, 8 pages.
(Continued)

*Primary Examiner* — Eric Myers
(74) *Attorney, Agent, or Firm* — Alleman Hall Creasman & Tuttle LLP (57) ABSTRACT

A mobile communication device includes a network transceiver configured to communicate with a cellular network, a cluster transceiver configured to communicate with other mobile communication devices, and a communication management subsystem. The communication management subsystem is configured to send to each of a plurality of candidate mobile communication devices, a setup request, receive from each of the plurality of candidate mobile communication devices, a network signal strength, determine a network signal strength of the mobile communication device, if the network signal strength of the mobile communication device is greater than the network signal strength of each of the plurality of candidate mobile communication devices, send to the plurality of candidate mobile communication devices, a setup notification indicating that the mobile communication device is a cluster head configured to provide the candidate mobile communication devices with a connection to the cellular network via the network transceiver.

20 Claims, 5 Drawing Sheets

(51) Int. Cl.
*H04W 40/32* (2009.01)
*H04W 72/04* (2009.01)
*H04W 72/08* (2009.01)
*H04W 76/10* (2018.01)
*H04W 76/14* (2018.01)
*H04W 88/04* (2009.01)

(52) U.S. Cl.
CPC ............. *H04L 67/18* (2013.01); *H04W 40/32* (2013.01); *H04W 72/048* (2013.01); *H04W 76/10* (2018.02); *H04W 76/14* (2018.02); *H04W 88/04* (2013.01)

(58) Field of Classification Search
CPC ............... H04W 72/048; H04W 88/04; H04B 7/15507; H04L 67/1051; H04L 67/18
See application file for complete search history.

(56) References Cited

U.S. PATENT DOCUMENTS

| | | |
|---|---|---|
| 7,502,360 B2 | 3/2009 | Liu et al. |
| 8,467,369 B2 | 6/2013 | Yonge et al. |
| 8,774,756 B2 | 7/2014 | Bradburn |
| 8,958,539 B2 | 2/2015 | Emerson |
| 2006/0116121 A1 | 6/2006 | Rosado |
| 2007/0099613 A1 | 5/2007 | Burgan et al. |
| 2008/0102817 A1 | 5/2008 | Shenassa et al. |
| 2011/0055424 A1 | 3/2011 | Jiang et al. |
| 2013/0083722 A1* | 4/2013 | Bhargava ............... H04W 48/20 370/315 |
| 2014/0092833 A1 | 4/2014 | Vannithamby et al. |
| 2014/0357278 A1 | 12/2014 | Barlev et al. |
| 2015/0023208 A1 | 1/2015 | Beck et al. |
| 2015/0230160 A1 | 8/2015 | Lin et al. |
| 2015/0289282 A1 | 10/2015 | Phuyal et al. |
| 2015/0327076 A1 | 11/2015 | Cui et al. |
| 2016/0337936 A1* | 11/2016 | Li ......................... H04W 40/04 |

OTHER PUBLICATIONS

ISA European Patent Office, International Search Report and Written Opinion Issued in PCT Application No. PCT/US2017/013689, dated May 4, 2017, WIPO, 12 Pages.

Poole, Ian, "Cellular Handover and Handoff", Published on: Aug. 22, 2010, Available at: http://www.radio-electronics.com/info/cellulartelecomms/cellular_concepts/handover_handoff.php.

* cited by examiner

MOBILE COMMUNICATION DEVICE CLUSTERING

BACKGROUND

A mobile communication device, such as cellular phone, may send/receive data (e.g., voice, messages) over a cellular network when the cellular phone has network signal coverage from a network provider. In particular, the cellular phone may communicate over the cellular network by establishing a connection with a network device (e.g., cellular tower) of the network provider.

DETAILED DESCRIPTION

A mobile communication device may send/receive data over a cellular network when the mobile communication device has network signal coverage from a network provider (e.g., is within range of a cellular tower). However, in some cases, the mobile communication device may located where there is little or no network signal coverage from its associated network provider. As such, the mobile communication device may have limited or no network connectivity.

Accordingly, the present description is directed to sharing network connectivity from any available network provider among a cluster of mobile communication devices near one another. More particularly, an approach is described for a device with sufficient connectivity to act as a cluster head of a cluster of mobile communication devices near one another (e.g., in the same geographic region). The cluster head may act as an intermediary (e.g., an antenna system) through which other devices of the cluster may send data (e.g., voice, messaging, etc.), with the cluster head then forwarding that data to a cellular network via a connection with a cell tower or other network device. For example, other mobile communication devices may send data to the cluster head when those mobile communication devices have limited or no network connectivity. The cluster head may also provide downlink service to the other devices of the cluster, by receiving data from the cellular network and forwarding that data to the appropriate member of the cluster.

According to such an approach, network connectivity may be provided to a mobile communication device that would otherwise be out of signal coverage range. Such an approach may facilitate connection where different coverage levels are provided by different networks in different geographic regions, including situations where a network provides no coverage. In other words, such an approach may enable a mobile communication device that does not have network coverage from its associated provider to still have network connectivity by sending data through a cluster head that has connectivity with a different provider. Moreover, such an approach may be extended to provide network connectivity to any mobile communication device of a cluster as long as at least one mobile communication device of the cluster has network connectivity.

Figure 1:
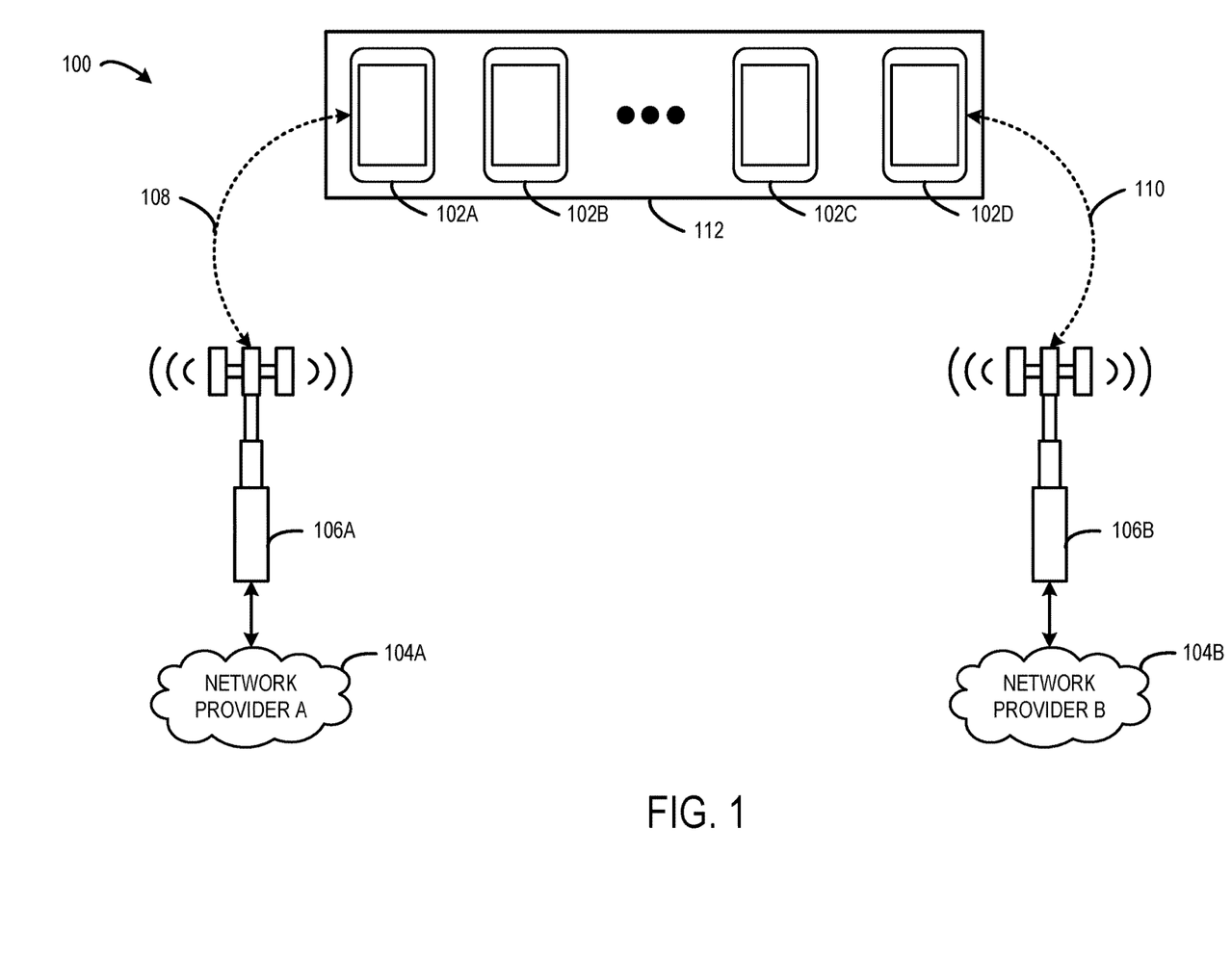
FIG. 1 shows an example mobile communication technology environment.

FIG. 1 shows an example mobile communication technology environment 100 in which a plurality of mobile communication devices 102 (e.g., 102A, 102B, 102C, 102D) may selectively communicate with one or more of a plurality of cellular networks 104 (e.g., 104A, 104B) associated with different network providers (e.g., NETWORK PROVIDER A, NETWORK PROVIDER B). In particular, the plurality of mobile communication devices 102 may communicate with the plurality of cellular networks 104 via various network devices 106 (e.g., 106A, 106B). In typical examples, network devices take the form of cellular towers that enable mobile devices to communication with network/service providers.

In the depicted example, a single network device 106 is connected to a cellular network 104 associated with each network provider, although in actuality a network provider typically will have numerous network devices 106 in different locations to enable widely dispersed devices to connect to the provider network. The mobile communication technology environment 100 may include any suitable number of network providers and any suitable number of network devices 106.

Furthermore, the mobile communication technology environment 100 may include any suitable number of mobile communication devices 102. Non-limiting examples of mobile communication devices include cellular phones, smartphones, tablets, laptops, and other mobile computing devices. Typically, a mobile communication device 102 is configured to connect to a cellular network 104 of a single network provider, e.g., as a result of a service contract. However, in some implementations, mobile communication devices 102 may be configured to connect to multiple cellular networks 104 associated with different network providers.

A mobile communication device 102 may communicate with a particular network device 106 depending on a geographic location of the mobile communication device 102 relative to that network device 106. A network device 106 typically has a fixed location, while mobile communication device 102 typically changes locations. As such, a mobile communication device 102 may have varying levels of network signal strength with a network device 106 as the mobile communication device 102 change locations.

Moreover, in some cases, a mobile communication device 102 may communicate with different network devices 106 as the mobile communication device 102 changes locations. When a mobile communication device 102 has network connectivity, the mobile communication device 102 may send/receive voice data (e.g., place/take phone calls), message data (e.g., text messages), and/or other data (e.g., Internet browsing, streaming media). In some cases, a mobile communication device 102 may move out of a range of network signal coverage of any network devices 106 of a network provider, and the mobile communication device 102 may therefore be unable to directly connect with a cellular network 104.

In the illustrated example, mobile communication device 102A is positioned at a geographic location that is within a network signal coverage range of network device 106A (e.g., a cellular tower). As such, mobile communication device 102A may establish a wireless network connection 108 with network device 106A to send/receive data over cellular network 104A associated with NETWORK PROVIDER A. For example, mobile communication device 102A may include a network transceiver configured to send/receive signals to network device 106A. Similarly, mobile communication device 102D is positioned at a geographic location that is within a network signal coverage range of network device 106B (e.g., a cellular tower). As such, mobile communication device 102D may establish a wireless network connection 110 with network device 106B to send/receive data over network 104B associated with NETWORK PROVIDER B. For example, mobile communication device 102D may include a network transceiver configured to send/receive signals to network device 106B.

On the other hand, mobile communication devices 102B and 102C are positioned at geographic locations that are out of network signal coverage ranges of network devices 106 corresponding to network providers of those devices. For example, mobile communication device 102B may be associated with NETWORK PROVIDER B, and may be positioned too far away from network device 106B to connect to network 104B. Likewise, mobile communication device 102C may be associated with NETWORK PROVIDER A, and may be positioned too far away from network device 106A to connect to network 104A.

In another example, one or more of the plurality of mobile communication devices may have some level of network connectivity, however that level may be less than desirable to provide network-related functionality. For example, mobile communication device 102B may be associated with NETWORK PROVIDER A. Mobile communication device 102B may be positioned a distance from network device 106A such that mobile communication device 102B has low network signal coverage (e.g., 1 out of 5 bars of service) from network device 106A, which is less than the network signal coverage of mobile communication device 102A (e.g., 5 out of 5 bars of service).

In another example, only one mobile communication device of the plurality of network devices 102 may have network connectivity. For example, the plurality of mobile communication devices 102 may be in a geographic region where NETWORK PROVIDER A has network signal coverage and NETWORK PROVIDER B has little or no signal coverage. In this example, only a mobile communication device that is associated with NETWORK PROVIDER A may have network connectivity, such as mobile communication device 102A, and the other mobile communication devices may be associated with different network providers and do not have network signal coverage.

The scenarios described above are merely examples, and different mobile communication devices may have any different levels of network connectivity. Different mobile communication devices may have different levels of network connectivity for different reasons including, but not limited, differing levels of communication technology (e.g., stronger/weaker antennas), network device technology (e.g., stronger/weaker cellular towers), distances to network devices associated with particular network providers of the particular mobile communication devices, and network coverage (e.g., number of network device in a geographic region).

Furthermore, in the depicted example, the plurality of mobile communication devices 102 and the plurality of network devices 106 may be spaced apart by any suitable distance. For example, the mobile communication devices 102 may be anywhere from being a meter apart to tens of meters apart.

In order to provide network connectivity to mobile communication devices that are out of range of network signal coverage (or have low/intermittent network signal coverage), the mobile communication devices 102 may form a cluster 112. In particular, the mobile communication devices 102 may communicate directly with each other to establish the cluster 112. For example, the mobile communication devices 102 may communicate directly with each other via cluster transceivers that are separate from network transceivers that they use to communicate with cell towers 106. The cluster 112 may cover any suitable size of geographic region. In particular, the size of the geographic region covered by the cluster 112 may be dependent on the broadcast capabilities of the cluster transceivers of the mobile communication devices 102.

A cluster head may be designated from the mobile communication devices 102 of cluster 112. The mobile communication device 102 acting as the cluster head has network connectivity with a cellular network 104. Other mobile communication devices of the cluster 112 that have limited or no network connectivity may route data (e.g., voice, message) through the cluster head to send/receive data to/from the cellular network 104. In one example, a mobile communication device is selected as a cluster head based at least on having a greatest network signal strength of all mobile communication devices 102 in the cluster 112. A cluster head may be selected based on any suitable characteristic(s) of the mobile communication devices 102.

Furthermore, the mobile communication device 102 acting as the cluster head may perform other cluster management operations. For example, if more than one mobile communication device 102 of the cluster 112 has network connectivity, the cluster head may select another device having connectivity to serve as a new cluster head based on various selection criteria. Selection criteria may be based on various characteristics of the mobile communication devices 102 that may be considered alone, or in combination, and the characteristics may be shared among the devices to coordinate selecting a new cluster head.

Figure 2:
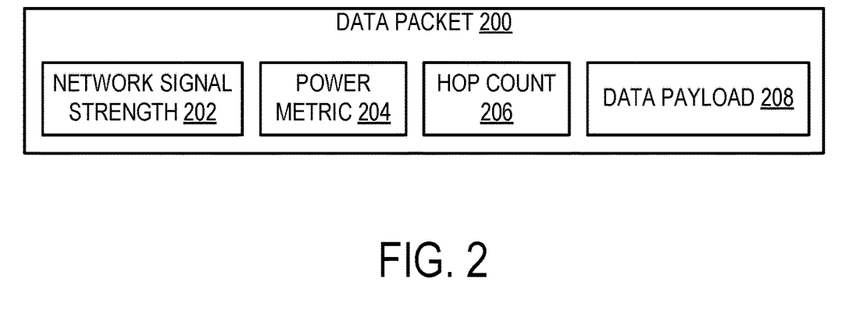
FIG. 2 shows an example data packet configured to be utilized in a mobile communication device cluster protocol.

In some implementations, data packets sent between the mobile communication devices 102 may be embedded with the above-mentioned characteristics used to select cluster heads. FIG. 2 shows an example data packet 200 that may be used by the mobile communication devices 102. Data packet 200 includes a network signal strength 202, a power metric 204, a hop count 206, and a data payload 208.

The network signal strength 202 indicates a level of connectivity (e.g., a magnitude of an electric field) between the mobile communication device and a network device (e.g., cell tower).

The power metric 204 represents an amount of power the mobile communication device can use to operate. In one example, the power metric 204 includes a battery state of charge of the mobile communication device. In another example, the power metric 204 includes probabilistic power formula that predicts future power consumption of the mobile communication device. In another example, the power metric 204 includes a normalized probabilistic remaining power estimation of the mobile communication device. The power estimation may be normalized to account for varying sizes and type of batteries/power sources of different types of mobile communication devices in the cluster.

The hop count 206 represents a number of network hops taken by the data packet 200 when the data packet 200 is sent from one mobile communication device to another mobile communication device. Within a given mobile device, a separate hop count may be maintained for each of the other devices in the cluster. The hop count 206 may be used to derive a location of a mobile communication device 102 relative to other mobile communication devices 102 in the cluster 112.

The data payload 208 may include any suitable type of data (e.g., voice, message) that is being sent from one mobile communication device to another, or over a cellular network. In some cases, the data payload may be empty or omitted from the data packet 200. For example, when a mobile communication device is attempting to establish a cluster, the mobile communication device may request only the characteristics of the other mobile communication devices within the same geographic region. Any suitable characteristics of the mobile communication devices 102 may be embedded into the data packet 200. Moreover, the data packet 200 may assume any suitable type of format.

When multiple mobile communication devices 102 in the cluster 112 have network connectivity, one or more of the network signal strength 202, the power metric 204, and/or the hop count 206 may be used as criteria to select a cluster head. In one example, a mobile communication device having a greatest network signal strength may be selected as the cluster head. However, if multiple devices have the same or similar network signal strengths, then the power metric may be used, e.g. as a tiebreaker or otherwise in combination with signal strength. For example, the device having a higher battery state of charge may be selected as the new cluster head. According to such an approach, a devices with the greatest power metric may be selected to perform the additional operations required of a cluster head relative to other devices of the cluster (e.g., acting as a conduit/ intermediary to the network provider). In another example, the new cluster head is selected base on location, such as derived from the hop count 206. In particular, a mobile communication device having a location that is most central to the locations of the plurality of mobile communication devices of the cluster may be selected as the new cluster head. According to such an approach, a collective distance (e.g., hop count) for different devices to send packets to the cluster head may be reduced, which may speed up data transfer operations of the cluster 112. Any suitable combination or derivations of the above-described examples may be employed to select a new cluster head.

In one example, the cluster head is assigned to different mobile communication devices 102 of the cluster 112 according to a time slice approach. In particular, a mobile communication device 102 may be designated as the cluster head for a designated duration, and the cluster head may be switched to a new device (assuming another device is capable) each time the duration has been exceeded. Accordingly, power consumption may be spread around to different mobile communication devices of the cluster that act as a cluster head. Such an approach may preserve battery power of a given mobile communication device relative to an approach in which a single mobile communication device is designated as cluster head.

Continuing with FIG. 1, in the depicted example, because mobile communication devices 102A and 102D have network connectivity, these devices may be eligible to act as the cluster head for cluster 112. For example, mobile communication devices 102A and 102D may switch off acting as the cluster head based on the above-described time slice scheme. When the mobile communication device 102A acts as the cluster head, the other mobile communication devices 102B and 102C that do not have network connectivity may send data to the mobile communication device 102A. The mobile communication device 102A relays the data to the network device 106A to be sent over the cellular network 104A. The mobile communication device 102D may operate in a similar manner when acting as the cluster head of the cluster 112, but communicating with cellular network 104B.

Figure 3:
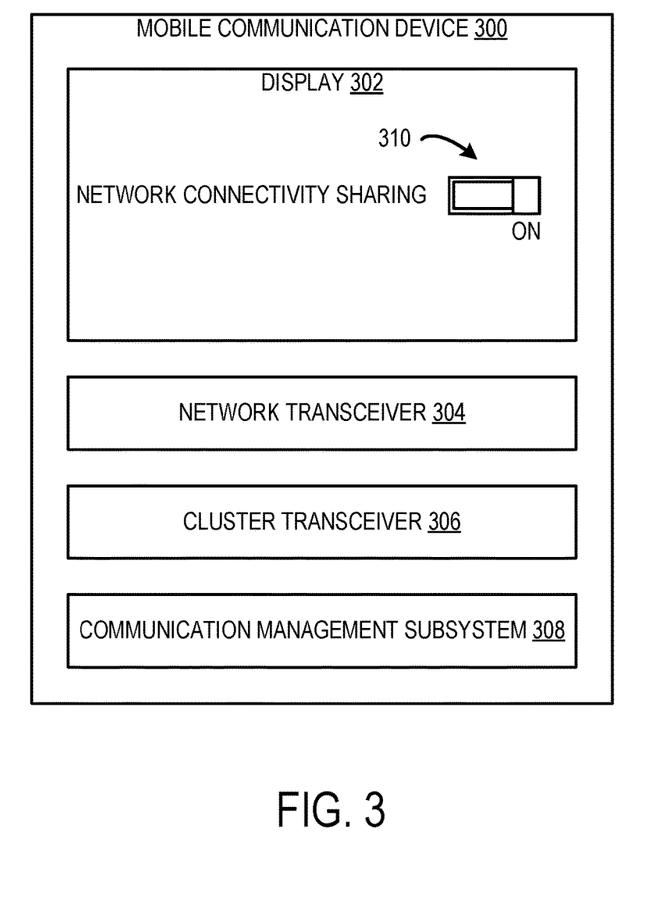
FIG. 3 shows an example mobile communication device configured to implement a mobile communication device cluster protocol.

FIG. 3 shows an example mobile communication device 300 configured to establish and participate in a cluster of mobile communication devices for sharing network connectivity. The mobile communication device 300 is shown in simplified form. The mobile communication device 300 includes a display 302, a network transceiver 304, a cluster transceiver 306, and a communication management subsystem 308.

The display 302 visually presents information related to operation of the mobile communication device 300. For example, the display 302 may visually present an activation state 310 of a network connectivity sharing feature. The activation state 310 may act as a trigger to establish a cluster with other mobile communication devices in a same geographic region as the mobile communication device 300. In particular, if the activation state 310 is on, then the mobile communication device 300 performs various operations to establish or join a cluster. If the activation state 310 is off, then the mobile communication device 300 does not participate in the cluster. The activation state 310 may be toggled via user input to the mobile communication device 300. In some implementations, the network connectivity sharing feature may be activated in a manner other than via user-activation. For example, the network connectivity sharing feature may be activated/deactivated by a device manufacture or network provider, or automatically in response to user configuration or other circumstance.

The network transceiver 304 is configured to communication with one or more cellular networks, such as the cellular networks 104 via network devices 106 shown in FIG. 1. The network transceiver 304 may include any suitable communication technology.

The cluster transceiver 306 is configured to communicate directly with one or more other mobile communication devices. The cluster transceiver 306 may include any suitable communication technology, such as Bluetooth. The cluster transceiver 306 may in some cases be a physically separate radio from the network transceiver 304. Although the cluster transceiver 306 typically is separate from the network transceiver 304, in some implementations, the two transceivers may share hardware components. For example, the two transceivers may be implemented on a same integrated circuit. Because the cluster transceiver 306 is separate from the network transceiver 304, both transceivers may operate simultaneously. Such simultaneous operation allows the mobile communication device 300 to send/receive data to/from another mobile communication device via the cluster transceiver 306, while at the same time sending/receiving data over the cellular network via the network transceiver 304. In other words, this dual transceiver configuration enables the mobile communication device 300 to act as a cluster head.

The communication management subsystem 308 may be configured to perform operations related to establishing, managing, and/or participating in a cluster of mobile communication devices for sharing network connectivity. Such operations are discussed in more detail below with reference to method 400 shown in FIGS. 4-5. As used herein, "subsystem" means physical data-storage and processing circuit(s) and/or other hardware programmed with instructions to perform specialized computing operations.

Figure 4:
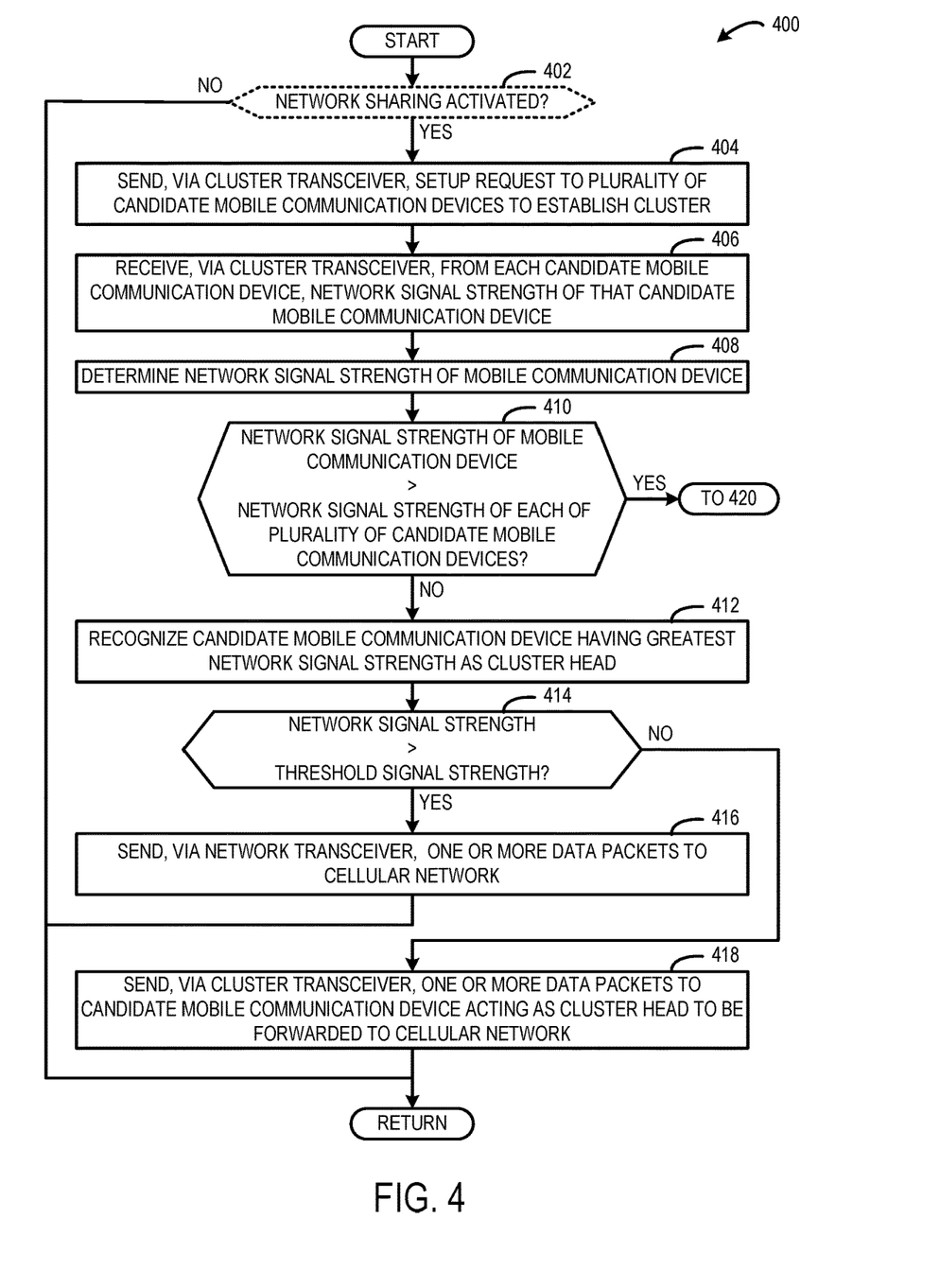
FIGS. 4-5 show an example method for sharing network connectivity among mobile communication devices in a cluster.
Figure 5:
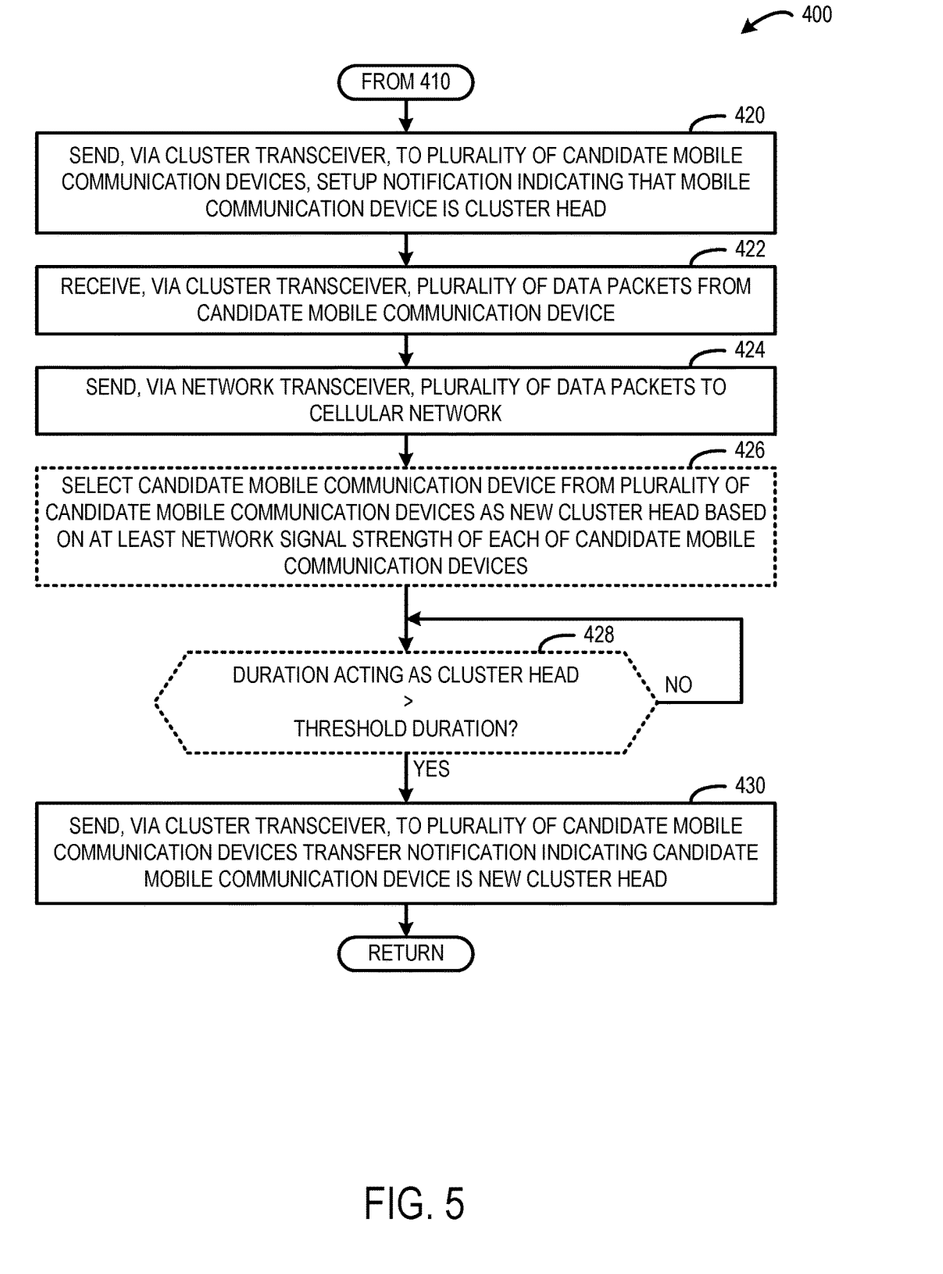

FIGS. 4 and 5 show an example method 400 for sharing network connectivity among mobile communication devices clustered in a same geographic region. For example, method 400 may be performed by any of the mobile communication devices 102 shown in FIG. 1, mobile communication device 300 shown in FIG. 3, and computing system 600 shown in FIG. 6.

In some implementations, as shown at 402, method 400 optionally may include determining whether a sharing function is activated on the mobile communication device. If so, then the method moves to 404. Otherwise, the method 400 returns to other operations. In one example, as shown in FIG. 2, the network connectivity sharing function of a mobile communication device can be activated/deactivated responsive to user input to the mobile communication device.

At 404, the method 400 includes sending, via a cluster transceiver, to each of a plurality of candidate mobile communication devices, a setup request to establish a cluster of mobile communication devices. The candidate devices may be any devices capable of and within a suitable range of receiving the setup request.

At 406, the method 400 includes receiving, via the cluster transceiver, from each of the plurality of candidate mobile communication devices, a network signal strength of that candidate mobile communication device. For example, each candidate mobile communication device may send a network signal strength of the candidate mobile communication device to the mobile communication device responsive to receiving the setup request.

At 408, the method 400 includes determining a network signal strength of each mobile communication device.

At 410, the method 400 includes determining whether the network signal strength of the mobile communication device is greater than a network signal strength of each of the plurality of candidate mobile communication devices. If the network signal strength of the mobile communication device is greater, then the method 400 moves to 420, as shown in FIG. 5. Otherwise, the method 400 moves to 412.

At 412, the method 400 includes recognizing a candidate mobile communication device having a greatest network signal strength as the cluster head.

At 414, the method 400 includes determining whether the network signal strength of the mobile communication device is greater than a threshold signal strength. The threshold signal strength may be any suitable signal strength. In one example, the threshold signal strength is zero or substantially no signal. If the network signal strength of the mobile communication device is greater than the threshold signal strength, then the method 400 moves to 416. Otherwise, the method 400 moves to 418.

At 416, the method 400 includes sending, via the network transceiver, one or more data packets to a cellular network. In this case, despite not being the cluster head, the mobile communication device has suitable network connectivity to send data directly to the network via the network transceiver.

At 418, the method 400 includes sending, via the cluster transceiver, one or more data packets to the candidate mobile communication device acting as the cluster head to be forwarded by the candidate mobile communication device acting as the cluster head to the cellular network. In this case, the mobile communication device does not have suitable network connectivity to send the data directly to the cellular network. Instead, the mobile communication device uses the candidate mobile communication device acting as the cluster head as an intermediate network antenna to send the data to the cellular network without actually directly connecting with the cellular network.

Turning to FIG. 5, at 420, the method 400 includes sending, via the cluster transceiver, to the plurality of candidate mobile communication devices, a setup notification indicating that the mobile communication device is a cluster head.

While the mobile communication device is acting as the cluster head, at 422 the method 400 includes receiving, via the cluster transceiver, a plurality of data packets from a candidate mobile communication device. For example, the candidate mobile communication device may have a network signal strength that is unsuitable to send the plurality of data packets directly to a cellular network.

At 424, the method 400 includes sending, via a network transceiver, the plurality of data packets to a cellular network. In this case, the mobile communication device acts as an intermediate network antenna to allow the candidate mobile communication device to send the plurality of data packets to the cellular network.

In some implementations, at 426, the method 400 optionally may include selecting a candidate mobile communication device from the plurality of candidate mobile communication devices as a new cluster head based on at least the network signal strength of each of the candidate mobile communication devices. In some implementations, the candidate mobile communication device may be selected as the new cluster head based on having a greatest network signal strength of the plurality of candidate mobile communication devices.

In some implementations, the candidate mobile communication device may be selected as the new cluster head further based on having a greatest power metric of the plurality of candidate mobile communication devices. In one example, the power metric includes a normalized probabilistic remaining power estimation of the candidate mobile communication device. For example, the probabilistic remaining power estimation may be normalized among different types and/or sizes of batteries/power sources of different types of mobile communication devices of the cluster.

In some implementations, the candidate mobile communication device may be selected as the new cluster head further based on a location of the candidate mobile communication device. More particularly, in some implementations, the candidate mobile communication device may be selected as the new cluster head further based on having a location that is most central to the locations of the plurality of candidate mobile communication devices of the cluster. As discussed above, in some implementations, the location of a mobile communication device may be derived from a hop count of a data packet sent from the candidate mobile communication device to the mobile communication device acting as the cluster head.

In some implementations, at 428, the method 400 optionally may include determining whether a duration that the mobile communication device has acted as the cluster head is greater than a threshold duration. The threshold duration may be any suitable duration. In one example, the duration is selected from a range of 5-10 seconds. In some implementations, the threshold duration may be set based on a number of mobile communication devices of the cluster. For example, the threshold duration may be decrease as a number of candidate mobile communication devices of the cluster increases. If the duration is greater than the threshold duration, then the method 400 moves to 430. Otherwise, the method 400 returns to 428.

At 430, the method 400 includes sending, via the cluster transceiver, to the plurality of candidate mobile communication devices a transfer notification indicating the candidate mobile communication device is the new cluster head. The candidate mobile communication device acting as the new cluster head may repeat steps 422-430, and so on for each mobile communication device acting as the cluster head of the cluster.

In some implementations, the cluster head may be switched to a candidate mobile communication device in a manner other than threshold duration/time slice approach. For example, the cluster head may be switched responsive to the mobile communication device performing a threshold number of data transfer events.

The method described above may be performed by communication management subsystem of a mobile communication device to establish and manage a cluster of mobile communication devices in a same geographic region for sharing network connectivity. Accordingly, network connectivity may be provided to mobile communication devices that would otherwise be out of range of network signal coverage.

In some implementations, the methods and processes described herein may be tied to a computing system of one or more computing devices. In particular, such methods and processes may be implemented as a computer-application program or service, an application-programming interface (API), a library, and/or other computer-program product.

Figure 6:
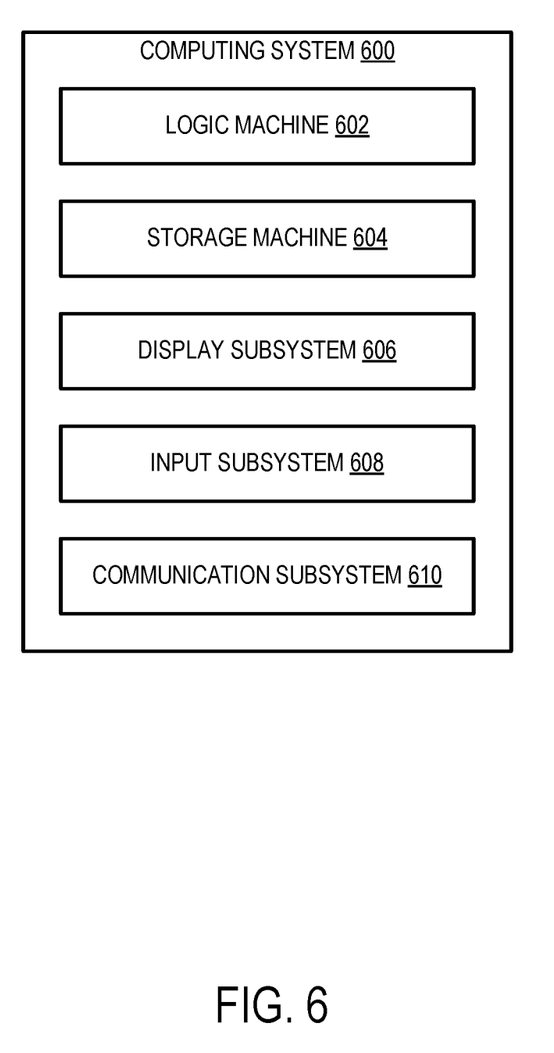
FIG. 6 shows an example computing system.

FIG. 6 schematically shows a non-limiting implementation of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices. Computing 600 may be representative of mobile communication devices 102 shown in FIG. 1 and/or mobile communication device 300 shown in FIG. 3.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine 602 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 602 may include one or more processors configured to execute software instructions. Additionally or alternatively, the logic machine 602 may include one or more hardware or firmware logic machines configured to execute hardware or firmware instructions. Processors of the logic machine 602 may be single-core or multi-core, and the instructions executed thereon may be configured for sequential, parallel, and/or distributed processing. Individual components of the logic machine 602 optionally may be distributed among two or more separate devices, which may be remotely located and/or configured for coordinated processing. Aspects of the logic machine 602 may be virtualized and executed by remotely accessible, networked computing devices configured in a cloud-computing configuration.

Storage machine 604 includes one or more physical devices configured to hold instructions executable by the logic machine 602 to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 606 may be used to present a visual representation of data held by storage machine 604. This visual representation may take the form of a graphical user interface (GUI). As the herein described methods and processes change the data held by the storage machine 604, and thus transform the state of the storage machine 604, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem 610 may be configured for communication via a wireless telephone network, or a wired or wireless local- or wide-area network. In some implementations, the communication subsystem may allow computing system 600 to send and/or receive messages to and/or from other devices via a network such as the Internet.

Additional aspects of the present disclosure are described below. According to one aspect, a mobile communication device comprises a network transceiver configured to communicate with a cellular network, a cluster transceiver configured to communicate with one or more other mobile communication devices, and a communication management subsystem configured to, send, via the cluster transceiver, to each of a plurality of candidate mobile communication devices, a setup request to establish a cluster of mobile communication devices, receive, via the cluster transceiver, from each of the plurality of candidate mobile communication devices, a network signal strength of that candidate mobile communication device, determine a network signal strength of the mobile communication device, and if the network signal strength of the mobile communication device is greater than the network signal strength of each of the plurality of candidate mobile communication devices, send, via the cluster transceiver, to the plurality of candidate mobile communication devices, a setup notification indicating that the mobile communication device is a cluster head configured to provide the candidate mobile communication devices with a connection to the cellular network via the network transceiver. In this aspect, the communication management subsystem may be further configured to, while the mobile communication device is acting as the cluster head, receive, via the cluster transceiver, a plurality of data packets from one of the candidate mobile communication device, and while the mobile communication device is acting as the cluster head, send, via the network transceiver, the plurality of data packets to the cellular network. In this aspect, the communication management subsystem may be further configured to select a candidate mobile communication device from the plurality of candidate mobile communication devices as a new cluster head based on at least the network signal strength of each of the candidate mobile communication devices, and send, via the cluster transceiver, to the plurality of candidate mobile communication devices a transfer notification indicating the candidate mobile communication device is the new cluster head. In this aspect, the candidate mobile communication device may be selected as the new cluster head based on having a greatest network signal strength of the plurality of candidate mobile communication devices.

In this aspect, the communication management subsystem may be further configured to receive, via the cluster transceiver, from each of the plurality of candidate mobile communication devices a power metric of the candidate mobile communication device, and where the candidate mobile communication device is selected as the new cluster head further based on the power metric. In this aspect, for each of the plurality of candidate mobile devices, the power metric may include a normalized probabilistic remaining power estimation of that candidate mobile communication device. In this aspect, the candidate mobile communication device may be selected as the new cluster head further based on a location of the candidate mobile communication device. In this aspect, the candidate mobile communication device may be selected as the new cluster head further based on having a location that is most central to locations of the plurality of candidate mobile communication devices. In this aspect, for each of the plurality of candidate mobile communication devices, the location of that mobile communication device may be derived from a hop count of a data packet sent from that candidate mobile communication device to the mobile communication device. In this aspect, the communication management subsystem may be further configured to send the transfer notification responsive to a duration that the mobile communication device acts as the cluster head being greater than a threshold duration. In this aspect, the threshold duration may be based on a number of mobile communication devices of the cluster. In this aspect, the communication management subsystem may be further configured to, if the network signal strength of the mobile communication device is not greater than each of the plurality of candidate mobile communication devices, recognize a candidate mobile communication device having a greatest network signal strength as the cluster head, and send one or more data packets to the candidate mobile communication device acting as the cluster head when the network signal strength of the mobile communication device is less than a threshold signal strength.

According to another aspect, on a mobile communication device, a method for sharing network connectivity comprises, sending, via a cluster transceiver, to each of a plurality of candidate mobile communication devices, a setup request to establish a cluster of mobile communication devices, receiving, via the cluster transceiver, from each of the plurality of candidate mobile communication devices, a network signal strength of that candidate mobile communication device, determining a network signal strength of the mobile communication device, and if the network signal strength of the mobile communication device is greater than the network signal strength of each of the plurality of candidate mobile communication devices, sending, via the cluster transceiver, to the plurality of candidate mobile communication devices, a setup notification indicating that the mobile communication device is a cluster head configured to provide the candidate mobile communication devices with a connection to a cellular network via a network transceiver. In this aspect, the method may further comprise receiving, via the cluster transceiver, a plurality of data packets from one of the candidate mobile communication device; and sending, via a network transceiver, the plurality of data packets to a cellular network. In this aspect, the method may further comprise selecting a candidate mobile communication device from the plurality of candidate mobile communication devices as a new cluster head based on at least the network signal strength of each of the candidate mobile communication devices, and sending, via the cluster transceiver, to the plurality of candidate mobile communication devices a transfer notification indicating the candidate mobile communication device is the new cluster head. In this aspect, the method may further comprise if the network signal strength of the mobile communication device is not greater than each of the plurality of candidate mobile communication devices, recognizing a candidate mobile communication device having a greatest network signal strength as the cluster head, and sending one or more data packets to the candidate mobile communication device acting as the cluster head when the network signal strength of the mobile communication device is less than a threshold signal strength.

According to another aspect, a mobile communication device comprises a network transceiver configured to communicate with a cellular network, a cluster transceiver configured to communicate with one or more other mobile communication devices, and a communication management subsystem configured to, send, via the cluster transceiver, to each of a plurality of candidate mobile communication devices, a setup request to establish a cluster of mobile communication devices, receive, via the cluster transceiver, from each of the plurality of candidate mobile communication devices, a network signal strength of that candidate mobile communication device, determine a network signal strength of the mobile communication device, if the network signal strength of the mobile communication device is greater than the network signal strength of each of the plurality of candidate mobile communication devices, send, via the cluster transceiver, to the plurality of candidate mobile communication devices, a setup notification indicating that the mobile communication device is a cluster head, receive, via the cluster transceiver, a plurality of data packets from one of the candidate mobile communication device, send, via the network transceiver, the plurality of data packets to the cellular network, select a candidate mobile communication device from the plurality of candidate mobile communication devices as a new cluster head based on at least the network signal strength of each of the candidate mobile communication devices, and send, via the cluster transceiver, to the plurality of candidate mobile communication devices a transfer notification indicating the candidate mobile communication device is the new cluster head. In this aspect, the communication management subsystem may be further configured to receive, via the cluster transceiver, from each of the plurality of candidate mobile communication devices a power metric of the candidate mobile communication device, and where the candidate mobile communication device is selected as the new cluster head further based on the power metric. In this aspect, the candidate mobile communication device may be selected as the new cluster head further based on having a location that is most central to the locations of the plurality of candidate mobile communication devices. In this aspect, the communication management subsystem may be further configured to send the transfer notification responsive to a duration that the mobile communication device acts as the cluster head being greater than a threshold duration.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A mobile communication device comprising:
   a network transceiver configured to communicate with a cellular network;
   a cluster transceiver configured to communicate with one or more other mobile communication devices; and
   a communication management subsystem configured to:
      send, via the cluster transceiver, to each of a plurality of candidate mobile communication devices, a setup request to establish a cluster of mobile communication devices;
      receive, via the cluster transceiver, from each of the plurality of candidate mobile communication devices, a network signal strength of that candidate mobile communication device;
      determine a network signal strength of the mobile communication device; and
      when the network signal strength of the mobile communication device is greater than the network signal strength of each of the plurality of candidate mobile communication devices, send, via the cluster transceiver, to the plurality of candidate mobile communication devices, a setup notification indicating that the mobile communication device is a cluster head configured to provide the candidate mobile communication devices with a connection to the cellular network via the network transceiver, and commanding each of the plurality of candidate mobile communication devices to relay data through the cluster head to the cellular network when that candidate mobile communication device does not have suitable cellular network connectivity.

2. The mobile communication device of claim 1, where the communication management subsystem is further configured to, while the mobile communication device is acting as the cluster head, receive, via the cluster transceiver, a plurality of data packets from one of the candidate mobile communication device, and while the mobile communication device is acting as the cluster head, send, via the network transceiver, the plurality of data packets to the cellular network.

3. The mobile communication device of claim 1, where the communication management subsystem is further configured to select a candidate mobile communication device from the plurality of candidate mobile communication devices as a new cluster head based on at least the network signal strength of each of the candidate mobile communication devices, and send, via the cluster transceiver, to the plurality of candidate mobile communication devices a transfer notification indicating the candidate mobile communication device is the new cluster head.

4. The mobile communication device of claim 3, where the candidate mobile communication device is selected as the new cluster head based on having a greatest network signal strength of the plurality of candidate mobile communication devices.

5. The mobile communication device of claim 3, where the communication management subsystem is further configured to receive, via the cluster transceiver, from each of the plurality of candidate mobile communication devices a power metric of the candidate mobile communication device, and where the candidate mobile communication device is selected as the new cluster head further based on the power metric.

6. The mobile communication device of claim 5, where for each of the plurality of candidate mobile devices, the power metric includes a normalized probabilistic remaining power estimation of that candidate mobile communication device.

7. The mobile communication device of claim 3, where the candidate mobile communication device is selected as the new cluster head further based on a location of the candidate mobile communication device.

8. The mobile communication device of claim 7, where the candidate mobile communication device is selected as the new cluster head further based on having a location that is most central to locations of the plurality of candidate mobile communication devices.

9. The mobile communication device of claim 7, where, for each of the plurality of candidate mobile communication devices, the location of that mobile communication device is derived from a hop count of a data packet sent from that candidate mobile communication device to the mobile communication device.

10. The mobile communication device of claim 3, where the communication management subsystem is further configured to send the transfer notification responsive to a duration that the mobile communication device acts as the cluster head being greater than a threshold duration.

11. The mobile communication device of claim 10, where the threshold duration is based on a number of mobile communication devices of the cluster.

12. The mobile communication device of claim 1, where the communication management subsystem is further configured to, if the network signal strength of the mobile communication device is not greater than each of the plurality of candidate mobile communication devices, recognize a candidate mobile communication device having a greatest network signal strength as the cluster head, and send one or more data packets to the candidate mobile communication device acting as the cluster head when the network signal strength of the mobile communication device is less than a threshold signal strength.

13. On a mobile communication device, a method for sharing network connectivity, the method comprising:
sending, via a cluster transceiver, to each of a plurality of candidate mobile communication devices, a setup request to establish a cluster of mobile communication devices;
receiving, via the cluster transceiver, from each of the plurality of candidate mobile communication devices, a network signal strength of that candidate mobile communication device;
determining a network signal strength of the mobile communication device; and
when the network signal strength of the mobile communication device is greater than the network signal strength of each of the plurality of candidate mobile communication devices, sending, via the cluster transceiver, to the plurality of candidate mobile communication devices, a setup notification indicating that the mobile communication device is a cluster head configured to provide the candidate mobile communication devices with a connection to a cellular network via a network transceiver, and commanding each of the plurality of candidate mobile communication devices to relay data through the cluster head to the cellular network when that candidate mobile communication device does not have suitable cellular network connectivity.

14. The method of claim 13, further comprising:
receiving, via the cluster transceiver, a plurality of data packets from one of the candidate mobile communication device; and
sending, via a network transceiver, the plurality of data packets to a cellular network.

15. The method of claim 13, further comprising:
selecting a candidate mobile communication device from the plurality of candidate mobile communication devices as a new cluster head based on at least the network signal strength of each of the candidate mobile communication devices; and
sending, via the cluster transceiver, to the plurality of candidate mobile communication devices a transfer notification indicating the candidate mobile communication device is the new cluster head.

16. The method of claim 13, further comprising:
if the network signal strength of the mobile communication device is not greater than each of the plurality of candidate mobile communication devices, recognizing a candidate mobile communication device having a greatest network signal strength as the cluster head; and
sending one or more data packets to the candidate mobile communication device acting as the cluster head when the network signal strength of the mobile communication device is less than a threshold signal strength.

17. A mobile communication device comprising:
a network transceiver configured to communicate with a cellular network;
a cluster transceiver configured to communicate with one or more other mobile communication devices; and
a communication management subsystem configured to:
send, via the cluster transceiver, to each of a plurality of candidate mobile communication devices, a setup request to establish a cluster of mobile communication devices;
receive, via the cluster transceiver, from each of the plurality of candidate mobile communication devices, a network signal strength of that candidate mobile communication device;
determine a network signal strength of the mobile communication device;
when the network signal strength of the mobile communication device is greater than the network signal strength of each of the plurality of candidate mobile communication devices, send, via the cluster transceiver, to the plurality of candidate mobile communication devices, a setup notification indicating that the mobile communication device is a cluster head;
receive, via the cluster transceiver, a plurality of data packets from one of the candidate mobile communication device;
send, via the network transceiver, the plurality of data packets to the cellular network;
select a candidate mobile communication device from the plurality of candidate mobile communication devices as a new cluster head based on at least the network signal strength of each of the candidate mobile communication devices; and
send, via the cluster transceiver, to the plurality of candidate mobile communication devices a transfer notification indicating the candidate mobile communication device is the new cluster head.

18. The mobile communication device of claim 17, where the communication management subsystem is further configured to receive, via the cluster transceiver, from each of the plurality of candidate mobile communication devices a power metric of the candidate mobile communication device, and where the candidate mobile communication device is selected as the new cluster head further based on the power metric.

19. The mobile communication device of claim 17, where the candidate mobile communication device is selected as the new cluster head further based on having a location that is most central to the locations of the plurality of candidate mobile communication devices.

20. The mobile communication device of claim 17, where the communication management subsystem is further configured to send the transfer notification responsive to a duration that the mobile communication device acts as the cluster head being greater than a threshold duration.

* * * * *